United States Patent

Ohtsu

[11] Patent Number: 5,970,181
[45] Date of Patent: Oct. 19, 1999

[54] IMAGE-SCANNING APPARATUS WITH A SHADING CORRECTION FUNCTION

[75] Inventor: Akira Ohtsu, Kanagawa-ken, Japan

[73] Assignee: Kabushiki Kaisha Toshiba, Kawasaki, Japan

[21] Appl. No.: 08/919,261

[22] Filed: Aug. 28, 1997

Related U.S. Application Data

[63] Continuation of application No. 08/318,545, Oct. 5, 1994, abandoned.

[30] Foreign Application Priority Data

Dec. 29, 1993 [JP] Japan .................................. 5-351324

[51] Int. Cl.[6] .............................. H04N 1/407; H04N 1/40
[52] U.S. Cl. .......................... 382/274; 358/406; 358/461; 358/486
[58] Field of Search .................................. 382/319, 254, 382/276, 274; 358/406, 401, 413, 451, 461, 474, 486, 494, 497; H04N 1/407, 1/40

[56] References Cited

U.S. PATENT DOCUMENTS

| | | | |
|---|---|---|---|
| 4,573,787 | 3/1986 | Sanbayashi et al. | 355/14 E |
| 4,720,729 | 1/1988 | Watanabe | 355/14 R |
| 5,206,501 | 4/1993 | Sakakibara et al. | 250/208.1 |
| 5,734,758 | 3/1998 | Yamamoto et al. | 382/274 |

FOREIGN PATENT DOCUMENTS

| | | |
|---|---|---|
| 59228237 | 12/1984 | Japan . |
| 0352452 | 3/1991 | Japan . |

*Primary Examiner*—Kim Yen Vu
*Attorney, Agent, or Firm*—Foley & Lardner

[57] ABSTRACT

An image-scanning apparatus for scanning an original in an image-reading area to output image data, includes, a platen on which the original is placed, a reference plate which has a reference color, and a scanning device for optically scanning the reference plate and the original placed on the platen to provide a first optical image and a second optical image. The image-scanning apparatus also has a receiving device for receiving the first optical image and the second optical image so as to output electrical signals, a setting device for setting a correcting amount on the basis of the electrical signals, a correcting device for correcting the scattering of the electrical signals to output the image data, a calculating device for calculating a pre-running length corresponding to a predetermined speed, the scanning device is accelerated in a pre-running portion corresponding to the pre-running length so that the scanning device reaches the predetermined speed, a determining device for determining that the reference plate is sufficiently included in the pre-running portion, a control system for controlling the scanning device and the setting device corresponding to the detecting operation of the determining device so that the scanning device performs the scanning operation efficiently.

11 Claims, 14 Drawing Sheets

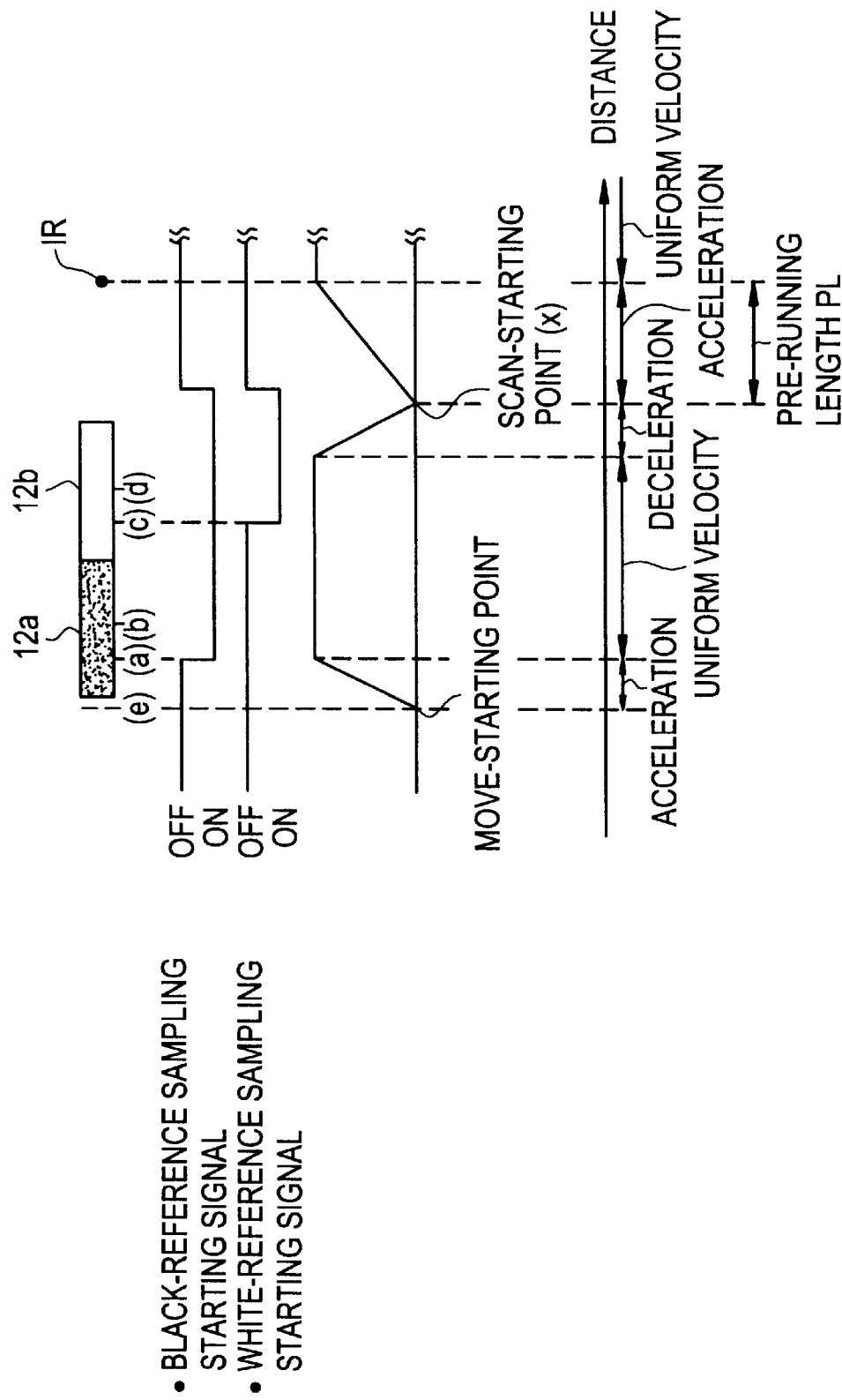

IMAGE-SCANNING APPARATUS WITH A SHADING CORRECTION FUNCTION

This application is a continuation of application Ser. No. 08/318,545, filed Oct. 5, 1994 abandoned.

BACKGROUND OF THE INVENTION

1. Field of the Invention

The present invention relates to an image-scanning apparatus which has a shading correction function and a reference plate used for making a reference data for the shading correction.

2. Description of the Related Art

Image-scanning devices which have a CCD sensor for converting an optical image into an electrical signal are very popular. The electrical signals are subjected to a shading correction circuit before providing image data. The shading correction circuit corrects the scattering of the electrical signals. This type of image-scanning devices are, for example, disclosed in U.S. Pat. No. 5,206,501. This image-scanning device has a reference plate, and generates a reference data by using the reflected light quantity from the reference plate. The shading correction circuit performs a shading correction operation on the basis of the reference data. The image-scanning device radiates a light to the reference plate before an image-scanning operation, and makes the reference data.

Recently, as disclosed in, for example, U.S. Pat. No. 4,720,729, image-scanning devices which have a so-called zoom indicating function have been provided. This type image-scanning device indicates an image-reading area by a scale arranged on a carriage, and the carriage is positioned at a place under a platen before the scanning operation. This function is very helpful especially, for an operator who is not familiar with the image-scanning device, because the carriage indicates the position at which an original should be placed.

However, when both the shading correction function and the so-called zoom indicating function are adopted, the time period it takes to scan an original image is long because the carriage has to move from the position at which the carriage indicates an image-reading area, to the reference plate before starting the scanning operation.

SUMMARY OF THE INVENTION

It is therefore an object of the present invention to provide an improved image-scanning apparatus.

It is a particular object of the present invention to provide an image-scanning apparatus which has both a shading correction function and a so-called zoom indicating function, and which prevents the time period which a scanning device takes to scan an original image from being long.

It is a further object of the present invention to provide an improved image-forming apparatus.

Another object of the present invention is to provide an improved image-scanning method.

In accordance with one aspect of the present invention, the foregoing objects among others, are achieved by providing an image-scanning apparatus for scanning an original in an image-reading area to output an image data which includes, a platen on which the original is placed, an exposure lamp for exposing an original to make an optical image, and a carriage on which the exposure lamp is arranged. The carriage moves along the original on the platen. The image-scanning apparatus also includes a reference plate which has a reference color. The reference plate is arranged near the platen. The image-scanning apparatus also includes a driving mechanism connected to the carriage, for driving the carriage at one of a plurality of speeds so that the exposure lamp exposes the reference plate and the original image in order, a CCD sensor for receiving a first optical image from the reference plate and a second optical image from the original exposed by the exposure lamp so as to output electrical signals, a setting device for setting the correcting amount on the basis of the electrical signals corresponding to the first optical image, a shading correction circuit for correcting the scattering of the electrical signals by using the correcting amount, and for outputting the image data, and a calculating device for calculating a pre-running length corresponding to the speed, wherein the driving mechanism accelerates the carriage in a corresponding pre-running portion so that the carriage reaches the speed. Furthermore, the image-scanning apparatus includes a determining device for determining that the reference plate is sufficiently included in the pre-running portion, and a controlling device for controlling the driving mechanism and the setting device so that the setting device sets the correcting amount while the driving mechanism moves the carriage in the pre-running portion when the determining device determines that the reference plate is sufficiently included in the pre-running portion, and such that the driving mechanism drives the carriage and the carriage faces the reference plate before the carriage has reached the pre-running portion and the setting device sets the correcting amount when the determining device does not determine that the reference plate is sufficiently included in the pre-running portion.

In accordance with another aspect of the present invention, there has been provided an image-scanning apparatus for scanning an original in an image-reading area to output an image data. The image-scanning apparatus has a platen on which the original is placed, a reference plate which has a reference color, the reference plate is arranged near the platen, and a scanning device for optically scanning the reference plate and the original on the platen to make a first optical image and a second optical image. The image-scanning apparatus has a receiving device for receiving the first optical image and the second optical image so as to output electrical signals, a setting service for setting a correcting amount on the basis of the electrical signals corresponding to the first optical image, and a correcting device for correcting the scattering of the electrical signals by using the correcting amount, and for outputting the image data. The image-scanning apparatus also has a calculating device for calculating a pre-running length corresponding to the speed, the scanning device is accelerated in a pre-running portion corresponding to the pre-running length so that the scanning device reaches the speed, a determining device for determining that the reference plate is sufficiently included in the pre-running portion, and a controlling device for controlling the scanning device and the setting device so that the setting device sets the correcting amount while the scanning device moves in the pre-running portion when the determining device determines that the reference plate is sufficiently included in the pre-running portion, such that the scanning device scans the reference plate before the scanning device has reached the pre-running portion and the setting device sets the correcting amount when the determining device determines that the reference plate is not sufficiently included in the pre-running portion.

In accordance with another aspect of the present invention, there has been provided an image-forming apparatus for forming an image on an image-bearing member on the basis of an image data corresponding to an original image of the original. The image-forming apparatus has a platen on which the original is placed, a reference plate which has a reference color, the reference plate is arranged near the platen, and a scanning device for optically scanning the reference plate and the original on the platen so as to make a first optical image and a second optical image. The image-forming apparatus has a receiving device for receiving the first optical image and the second optical image so as to output electrical signals, a setting device for setting a correcting amount on the basis of the electrical signals corresponding to the first optical image, a correcting device for correcting the scattering of the electrical signals by using the correcting amount, and for outputting the image data, and an image-forming device for forming an image on an image-bearing member on the basis of the image data. The image-forming apparatus also has a calculating device for calculating a pre-running length corresponding to the speed, the scanning device being accelerated in a pre-running portion corresponding to the pre-running length so that the scanning device reaches the speed, a determining device for determining that the reference plate is sufficiently included in the pre-running portion, and a controlling device for controlling the scanning device and the setting device so that the setting device sets the correcting amount while the scanning device moves in the pre-running portion when the determining device determines that the reference plate is sufficiently included in the pre-running portion, and so that the scanning device scans the reference plate before the scanning device has reached the pre-running portion and the setting device sets the correcting amount when the determining device determines that the reference plate is not sufficiently included in the pre-running portion.

In accordance with another aspect of the present invention, there has been provided an image-scanning method for optically scanning an original in an image-reading area by a scanning member to output an image data. The image-scanning method includes the steps of (1) when a moving speed of the scanning member is more than a predetermined speed, and the scanning member passes a reference plate during a pre-running operation of the scanning member, moving the scanning member a move-starting point which is about a pre-running length away from the original, driving the scanning member from the move-starting point so as to accelerate up to the moving speed, and receiving a first optical image corresponding to the reference plate while scanning member moves in a pre-running portion corresponding to the pre-running length, the first optical image being formed by the scanning member. The image-scanning method includes the steps of setting a correcting amount on the basis of the first optical image, driving the scanning member at the moving speed in the image-reading area, receiving a second optical image corresponding to the original image to output an electrical signal, and correcting the electrical signal on the basis of the correcting amount to output an image data. The image-scanning method includes the steps of (2) when the moving speed of the scanning member is not more than a predetermined speed, and the scanning member does not sufficiently pass the reference plate during the pre-running operation of the scanning member, moving the scanning member to a move-starting point which is farther than the pre-running length from the original and which is set so that the scanning member passes the reference plate, driving the scanning member from the move-starting point to a scan-starting point at a predetermined speed, receiving the first optical image corresponding to the reference plate, the first optical image being formed by the scanning member, and setting a correcting amount on the basis of the first optical image. The image-scanning method further includes the steps of driving the scanning member from the scan-starting point so that scanning member is accelerated and is moved at the moving speed in the image-reading area, receiving a second optical image corresponding to the original image to output an electrical signal, and correcting the electrical signal on the basis of the correcting amount to output an image data.

In accordance with still another aspect of the present invention, there has been provided an image-scanning method for optically scanning an original in an image-reading area by a scanning member to output an image data. The image-scanning method includes the steps of setting a moving speed of the scanning member, moving the scanning member to a move-starting point which is about a pre-running length away from the original, the pre-running length corresponds to the set moving speed, the scanning member moves in a pre-running portion corresponding to the pre-running before a moving speed of the scanning member has reached at the set moving speed, driving the scanning member from the move-starting point so as to accelerate up to the moving speed, and receiving a first optical image formed by the scanning member at the reference plate while the scanning member moves in the pre-running portion. The image-scanning method has the steps of setting a correcting amount on the basis of the first optical image, driving the scanning member at the moving speed in the image-reading area, receiving a second optical image corresponding to the original image to output an electrical signal, and correcting the electrical signal on the basis of the correcting amount to output an image data.

BRIEF DESCRIPTION OF THE DRAWINGS

A more complete appreciation of the present invention and many of the attendant advantages thereof will be readily obtained as the intention becomes better understood by reference to the following detailed description, when considered in connection with the accompanying drawings, wherein:

FIGS. 8(a) to 8(e) are timing charts explaining the operation of the control system shown in FIGS. 4(a) to 4(d).

DETAILED DESCRIPTION OF THE PREFERRED EMBODIMENTS

Figure 1:
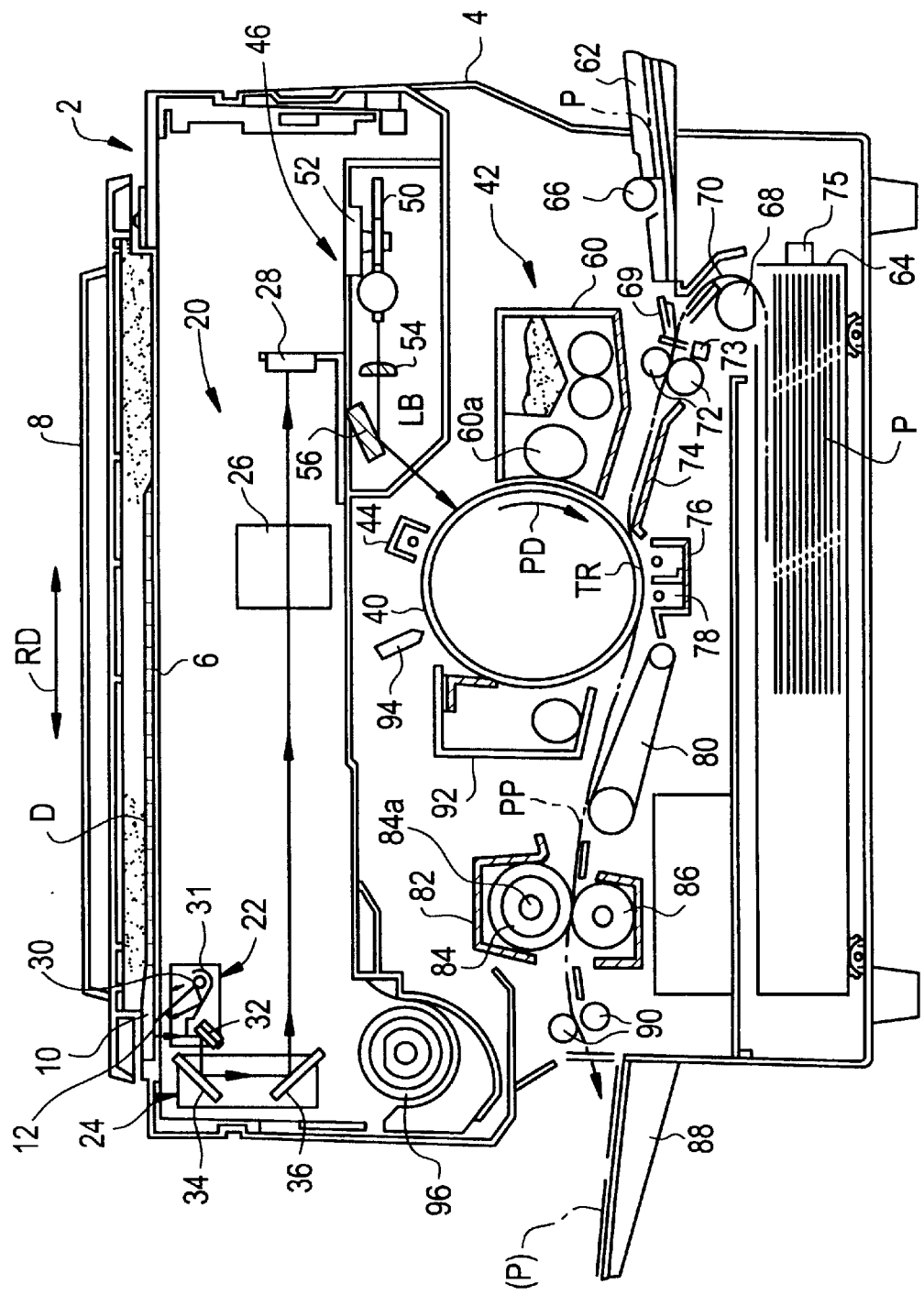
FIG. 1 is a sectional view showing the arrangement of a copying machine of an embodiment of the present invention.

FIG. 1 shows a copying machine 2 as an image-forming apparatus according to a first embodiment of the present invention. Copying machine 2 includes a copying machine housing 4. A platen 6 which is a transparent glass is fixed on the upper surface of housing 4. A platen cover 8 is arranged to removably cover platen 6. Platen cover 8 may be exchanged for an optional device, such as an automatic document feeder and a semi-automatic document feeder. A fixed scale 10 for indicating placement positions for positioning an original D is arranged at one end of platen 6. A black/white reference plate 12 is fixed on an opposite surface which is the back of fixed scale 10 as described later.

Original D placed on platen 6 is scanned for image exposure by an image-reading portion 20. Image-reading portion 20 includes a first carriage 22, a second carriage 24, and a lens block 26 for focusing the light from original D either unmagnified, magnified or reduced on to a CCD sensor 28. First carriage 22 includes an exposure lamp 30 such as a fluorescent lamp, a reflector 31 for reflecting the light from exposure lamp 30 to platen 6, and a mirror 32. Exposure lamp 30 exposes original D on platen 6 to make an optical image. Second carriage 24 includes a mirror 34 and a mirror 36. First carriage 22 and second carriage 24 are moved by a pulse motor (not shown), through a driving belt and some gears (not shown). Therefore, when image-reading portion 20 scans original D, original D is exposed by exposure lamp 30 while first carriage 22 and second carriage 24 reciprocate in the direction indicated by an arrow RD along the under surface of platen 6. In this case, second carriage 24 moves at a speed half that of first carriage 22 in order to maintain a fixed optical path length.

The optical image from original D scanned by image-reading portion 20 is reflected by mirror 32, mirror 34 and mirror 36, transmitted through lens block 26 and then directed to CCD sensor 28. CCD sensor 28 outputs electric signals corresponding to the reflected light beam indicating the original image of original D.

A photosensitive drum 40 is surrounded by an image-forming unit 42. Photosensitive drum 40 is rotated by a motor (not shown) in the direction indicated by an arrow PD so that its surface is wholly charged by a main charger 44. Therefore, the potential of the circumferential surface of photosensitive drum 40 is about −750 V. A laser beam LB is projected on the charged surface of photosensitive drum 40 by a laser unit 46, forming the electrostatic latent image. Laser unit 46 includes a semiconductor laser oscillator (not shown) for generating laser beam LB modulated in accordance with dot image data on the basis of the electronic signal output from CCD sensor 28. Also, laser unit 46 includes a collimator lens (not shown) for focussing laser beam LB emitted from the laser oscillator so that a cross-sectional shape of the laser beam LB is circular, a polygon mirror 50 for scanning laser beam LB focussed by the collimator lens, a mirror motor 52 for rotating polygon mirror 50 at a high speed, and fθ lens 54 to unify the focussing condition of the laser beam from the polygon mirror 50 in the scanning direction, and a mirror 56 for reflecting laser beam LB so that laser beam LB is radiated onto photosensitive drum 40.

The electrostatic latent image is developed into a visible image which is a toner image by a developing roller 60a of a developing unit 60 using two component developing agents. The bias voltage of developing unit 60 is about −500 V. Paper sheets P as an image record media are delivered one by one from a paper tray 62 or a paper cassette 64 by paper-supply roller 66 or paper-supply roller 68, respectively, and guided along a paper guide path 69 or a paper guide path 70, respectively, to an aligning roller pair 72. Paper sheet P is detected by an aligning switch 73 directly upstream of aligning roller pair 72 in the transportation direction of paper sheet P. Then, each paper sheet P is delivered to a transfer region TR by aligning roller pair 72 and a guide 74, timed to the formation of the visible image on photosensitive drum 40.

Paper cassette 64 is removably attached to the bottom portion of housing 4. Paper cassette 64 and paper tray 62 can be alternatively selected by the operator using a control panel described later. Paper cassette 64 is provided with cassette size detecting switches 75 (only one shown) which detect the size of paper sheet P contained in paper cassette 64. Detecting switches 75 are each formed by a plurality of microswitches which are turned on or off in response to insertion of cassettes which have different sizes of paper sheet P.

Paper sheet P delivered to transfer region TR comes into intimate contact with the surface of photosensitive drum 40, in the space between a transfer charger 76 which is a DC corona discharger and photosensitive drum 40. As a result, the toner image on photosensitive drum 40 is transferred to paper sheet P by the agency of transfer charger 76. After the transfer, paper sheet P is separated from photosensitive drum 40 by a separation charger 78 which is a vibratory (AC and DC) corona discharger and transported by a conveyor belt 80. Separation charger 78 removes the electrostatic force supplied between photosensitive drum 40 and paper sheet P in order to separate the paper sheet from photosensitive drum 40. Thereafter, paper sheet P is delivered to a fixing unit 82 arranged at the terminal end portion of conveyor belt 80 along a paper path PP. Fixing unit 82 includes a heat roller 84 which has a heater lamp 84a and a pressure roller 86 which is arranged in contact with heat roller 84. As paper sheet P passes a nip portion between heat roller 84 and pressure roller 86, the transferred image is fixed on paper sheet P. After the fixation, paper sheet P is discharged into a tray 88 outside housing 4 by exit roller pair 90.

After the transfer, moreover, the residual toner on the surface of photosensitive drum 40 is removed by a cleaner 92. Thereafter, a residual latent image on photosensitive drum 40 is erased by a discharge lamp 94 to restore the initial state. A cooling fan 96 for preventing the temperature inside housing 4 from rising is arranged at an upper-left portion of fixed unit 82.

The construction of the image-reading system including the original detector will now be described in detail.

Figure 2:
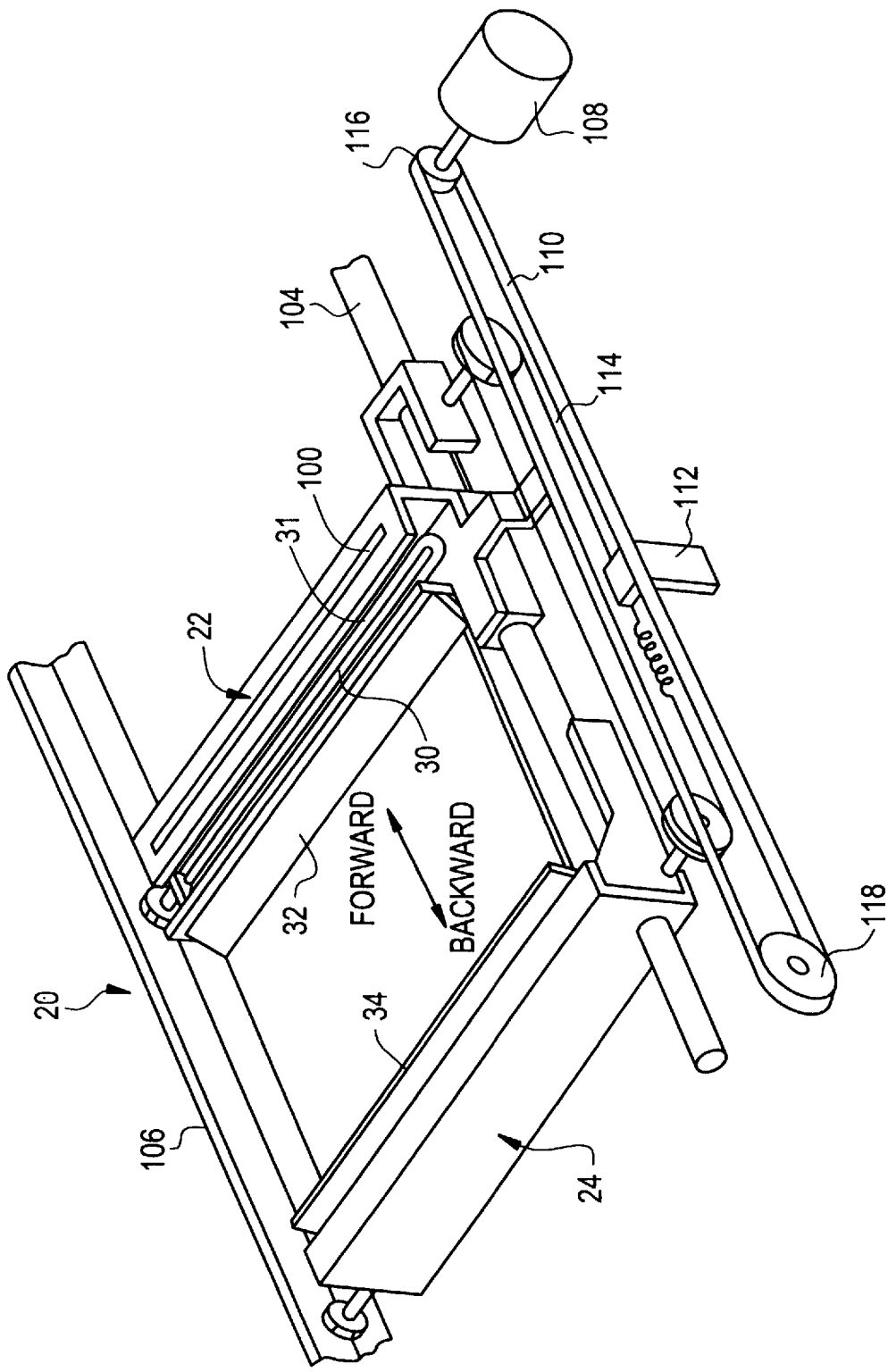
FIG. 2 is a perspective view schematically showing a construction of an image-reading portion of the copying machine shown in FIG. 1.

As shown in FIG. 2, first carriage 22 includes a mark 100 provided on the top face portion thereof. Mark 100 shows an image-reading area in which an original image of original D is scanned effectively, with fixed scale 10 through platen 6. The image-reading area changes corresponding to a magnification ratio between an original image and a copy image and/or the size of paper sheet P set by an operator using a control panel.

First carriage 22 and second carriage 24 are moveable along a guide shaft 104 and a guide rail 106. First carriage 22 and second carriage 24 are driven by a scanning motor 108 made by a pulse motor. By means of the mechanism including a driving belt 110, a wire-fixing portion 112, and a wire 114, first carriage 22 and second carriage 24 are moved backward and forward between one of the scan-starting points and one of the scan-ending points. Driving belt 110 is stretched between, and wound around a first pulley 116 and a second pulley 118.

There are six kinds of original sizes: A3 (420 mm×297 mm)—lengthwise, B4 (364 mm×257 mm)—lengthwise, A4 (297 mm×210 mm)—lengthwise, A4-crosswise, B5 (257 mm×182 mm)—lengthwise, and B5-crosswise, which could be placed on platen 6. Copying machine 2 may set in one of a plurality of the magnification ratios which range from 50% to 800%. Scanning motor 108 moves first carriage 22 by 0.168 mm per one step. Therefore, when mark 100 shows the reading area, an ordinate Wy of first carriage 22 is decided as follows:

Wy={(The length of original D in the direction of arrow RD)−43 mm)×100/(The magnification ratio (%))}/0.168+1000, wherein "1000" represents an ordinate of one end of platen 6 facing fixed scale 10, and "43 mm" represents the difference between exposure lamp 30 and mark 100. If the ordinate Wy is more than 4860 in value, the ordinate Wy is set to 4860 because 4860 represents the maximum ordinate to which first carriage 22 may be moved.

Figure 3:
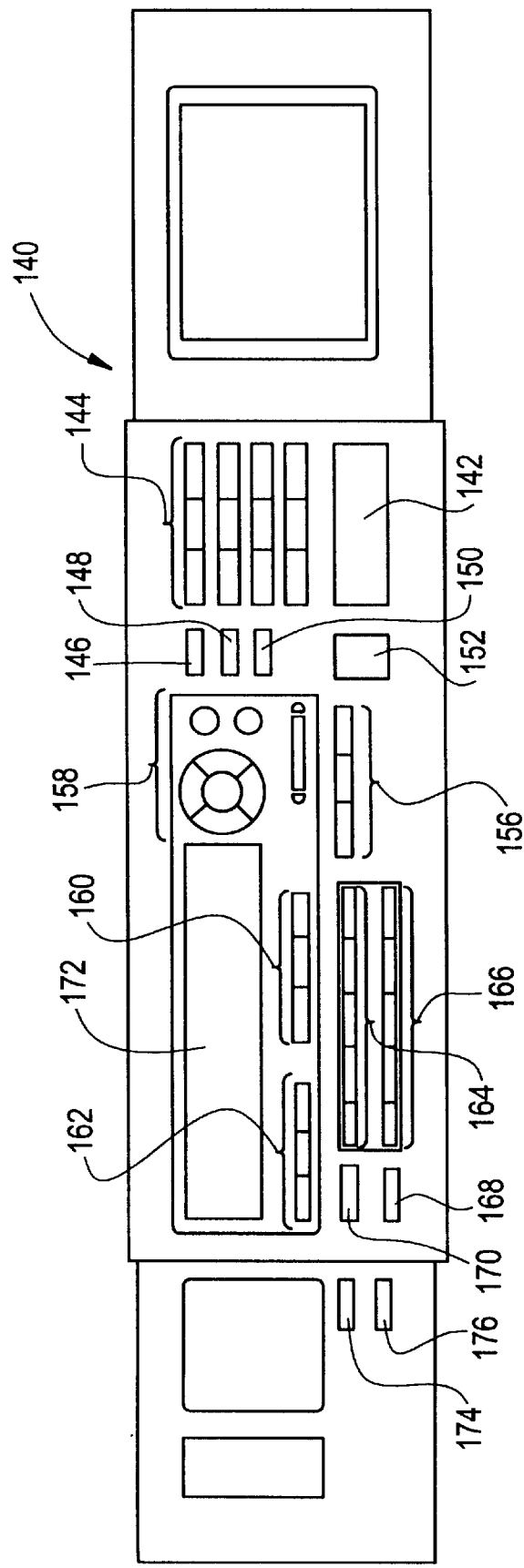
FIG. 3 is a plan view of a control panel of the copying machine shown in FIG. 1.

As mentioned above, the magnification ratio and/or the size of paper sheet P is set by an operator using control panel 140 as shown in FIG. 3.

Control panel 140 is mounted on housing 4. Control panel 140 carries thereon a copy key 142 for starting the copying operation, keys 144 for setting the number of copies to be made and the like, a function clear key 146 for setting the standard status, an energy saver key 148 for going into the energy-saving mode and turning all its display lamps off, an interrupt key 150 for making a copy of a different original during a multicopy run, and a clear/stop key 152 for clearing the copy quantity entered or stopping a multicopy run. Control panel 140 is further provided with a density setting section 156 for setting the copy density, and editing keys 158. Copying machine 2 forms a reflected image, an inclined image, an edge emphasized image, a shadow-added image, an outline image and so on in accordance with the operation of editing keys 158.

Furthermore, copying machine 2 is provided with operation guide keys 160 including "YES" key, "NO" key, and "HELP" key, for asking the appropriate operation procedure and answering the questions from copying machine 2, zoom keys 162 for adjustably setting the magnification ratio, namely, the enlargement or reduction ratio, an original size key 164 for setting an original size, a copy size key 166 for selecting the paper sheet size, an automatic paper selection key 168 for automatically detecting the size of the original set on original table 6 and determining that paper sheets P in paper cassette 64 are the same size as the original, an automatic magnification selection key 170 for automatically detecting the size of the original D set on original table 6 and calculating the correct reproduction or enlargement ratio, a display section 172 for indicating the operating conditions of the individual parts, and a partial copying mode setting keys 174 and 176. When partial copying mode setting key 171 is depressed, copying machine 2 is set in a trimming mode to make a trimming image. On the other hand, when partial copying mode setting key 176 is depressed, copying machine 2 is set in a masking mode to make a masking image.

A control system of copying machine 2 controls the copying operation, and is described in detail below.

Figure 4A:
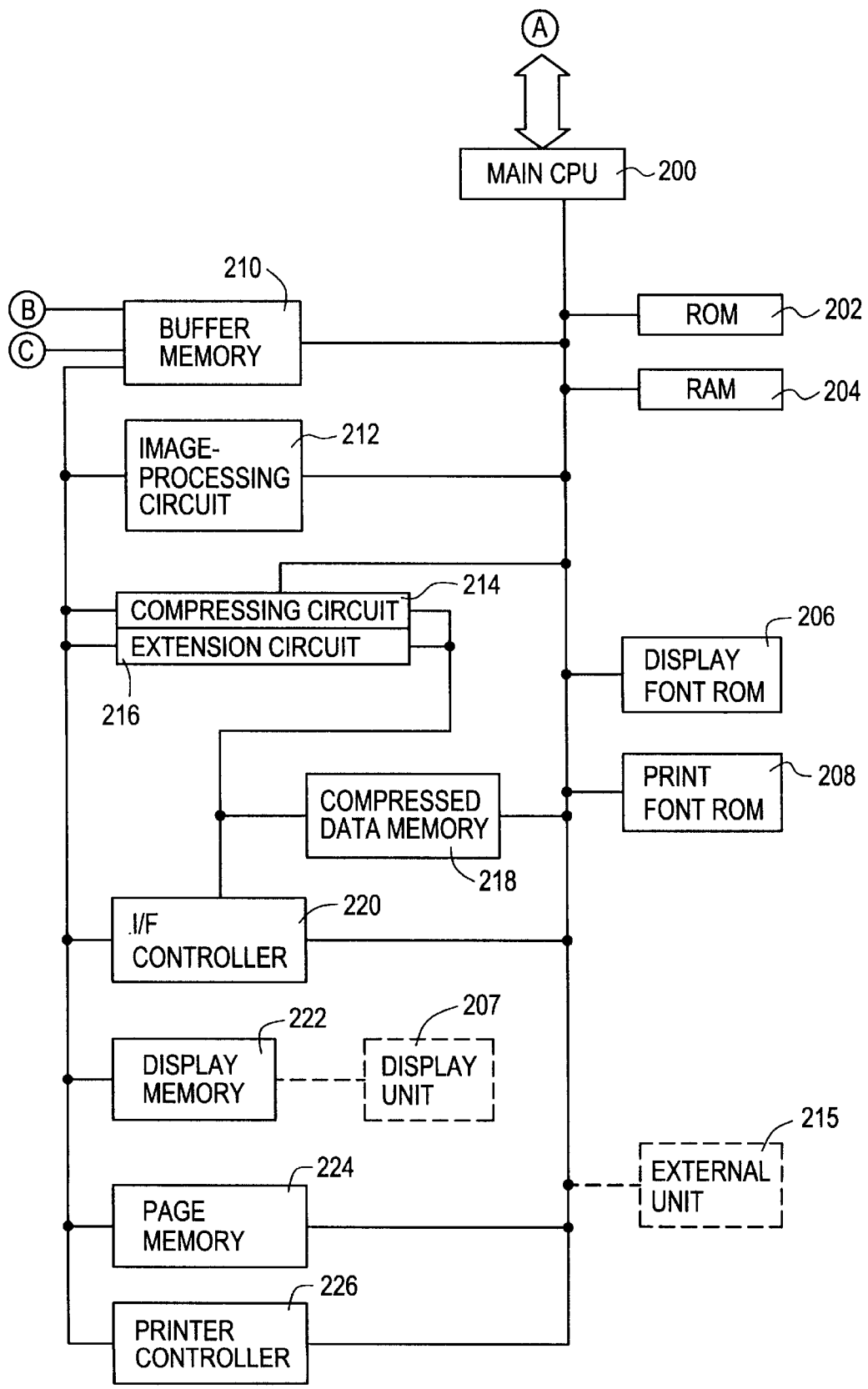
FIGS. 4(a) to 4(d) are diagrams showing a control system of the copying machine shown in FIG. 1.

As shown in FIG. 4(a), the control system has a main CPU 200 which controls the control system. A ROM 202 stores a control program and a data table described later. Main CPU 200 operates in accordance with the control program. A RAM 204 is used as a work buffer of main CPU 200. A display font ROM 206 stores a display font. Display unit 207, which couples to copying machine 2, displays an image including a character in accordance with the display font. A print font ROM 208 stores a print font. Image-forming unit 42 forms a character image and/or a graphic image in accordance with the print font. A buffer memory 210 temporarily stores image data sent from image-reading portion 20 corresponding to a destination to which the image data is sent, such as image-forming unit 42, and outputs the image data to the destination. An image-processing circuit 212 converts image data sent from image-reading portion 20, to a predetermined converted image data in accordance with a set condition by an operator using editing keys 158 on control panel 140. A compression circuit 214 compresses image data to send it to an external unit 215, such as a hard-disc driving apparatus, an optical disc driving apparatus, and an adapter of a facsimile apparatus. An extension circuit 216 extends the compressed image data sent from external unit 215. A compressed data memory 218 stores the compressed image data compressed by compression circuit 214 or sent from external unit 215. An I/F controller 220 is provided as an interface for giving and receiving compressed image data. A display memory circuit 222 stores display data so as to cause display unit 207 to display the image. A page memory 224 is used as a page buffer for temporarily storing image data from external unit 215 or image-reading portion 20. A printer controller 226 develops code data sent from external unit, such as a personal computer, to an image data.

Figure 4B:
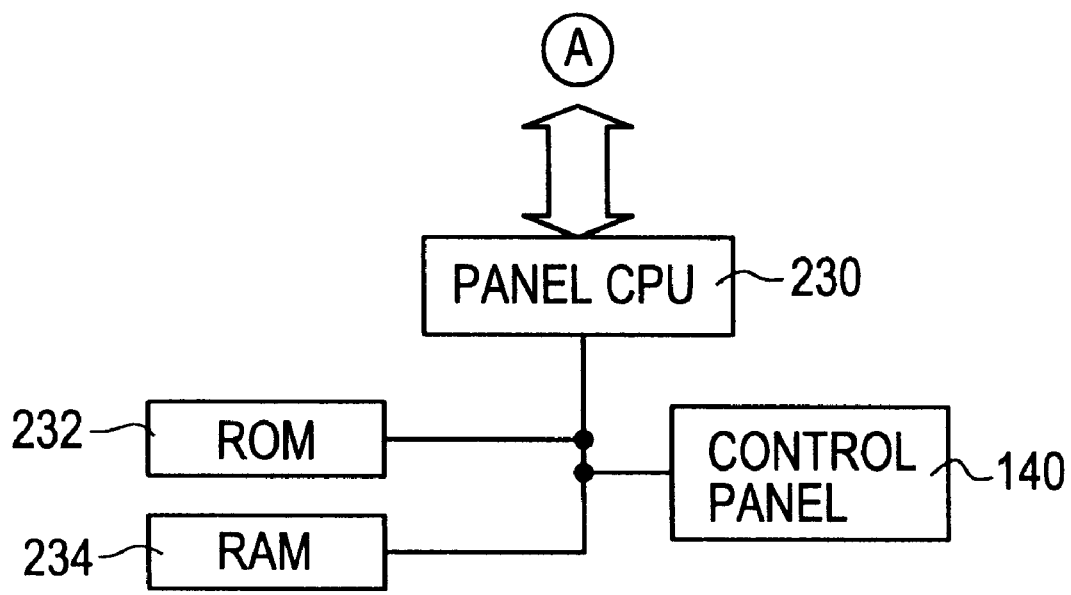

As shown in FIG. 4(b), main CPU 200 couples to a panel CPU 230. A ROM 232 stores a control program. Panel CPU 230 operates in accordance with the control program in ROM 232 and receives an output signal sent by control panel 140. Panel CPU 230 causes an LED on control panel 140 to turn on and off and causes display section 172 to display a message and/or a mark. A RAM 234 is used as a work buffer of panel CPU 230.

Figure 4C:
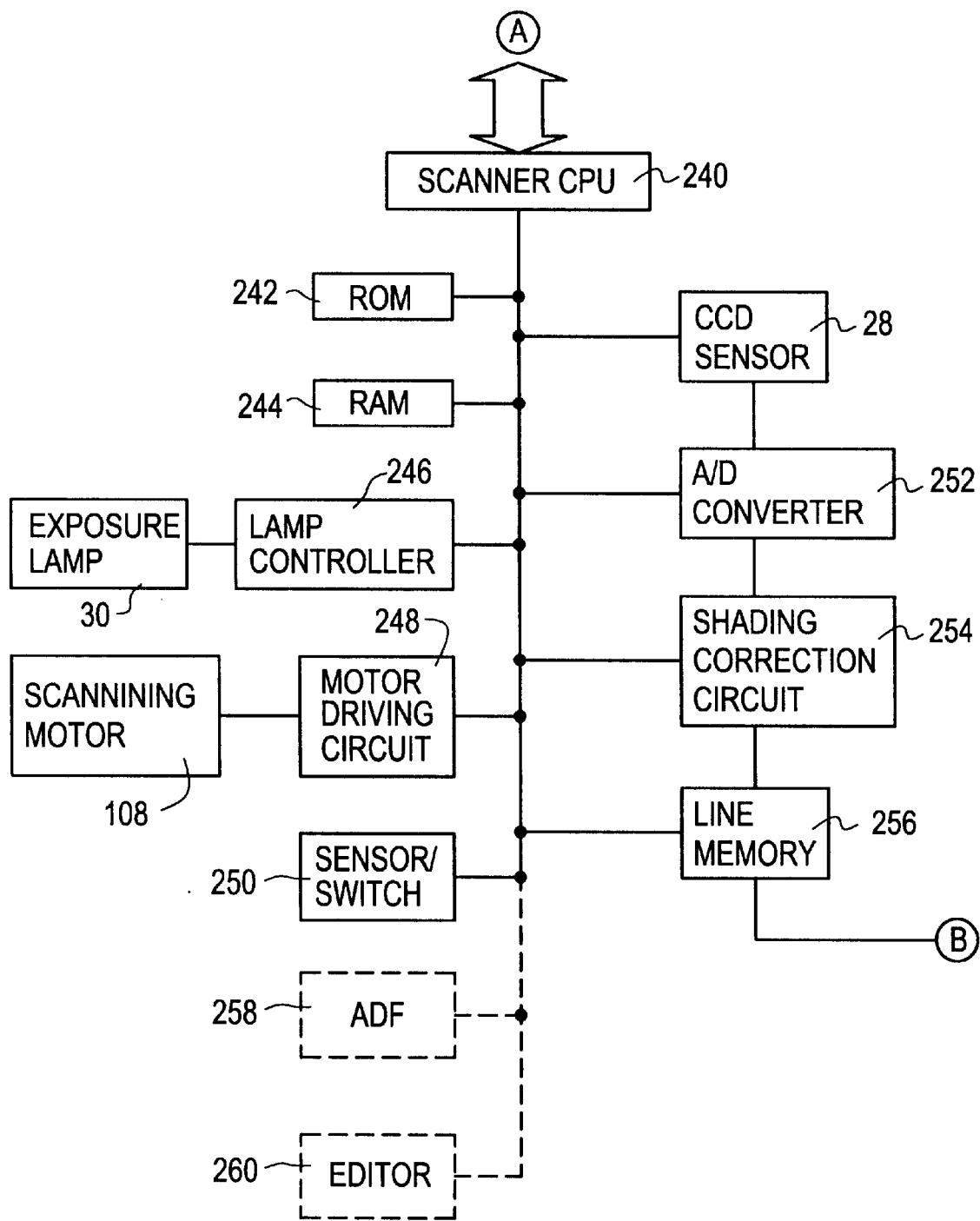

As shown in FIG. 4(c), main CPU 200 is also coupled to a scanner CPU 240. A ROM 242 stores a control program. Scanner CPU 240 operates in accordance with the control program in ROM 232. A RAM 244 is used as a work buffer of scanner CPU 240. Scanner CPU 240 is coupled to exposure lamp 30 via a lamp controller 246 for controlling exposure lamp 30, scanning motor 108 via a motor driving circuit 248, and an input device 250 including sensors and switches. Scanner CPU 240 also couples to CCD sensor 28, and A/D converter 252, a shading correction circuit 254, and a line memory 256. A/D converter 252 converts the electric signals output by CCD sensor 28 into digital data. The digital data output by A/D converter 252 are subjected to shading correction in shading correction circuit 254. Shading correction circuit 254 is set with a correcting amount for the shading correction by scanner CPU 240 in advance. Shading correction circuit 254 corrects the scattering of the digital data on the basis of the scattering of light intensity of exposure lamp 30 and/or a scattering of sensitivity between elements of CCD sensor 28, by using the correcting amount. When scanner CPU 240 sets the correcting amount, the light which exposure lamp 30 emits is directed to CCD sensor 28 via black/white reference plate 12. Line memory 256 stores the distal data corrected by shading correction circuit 254, and outputs them as an image data to buffer memory 210 per one line. Furthermore, scanner CPU 240 may be coupled to an automatic-document feeder 258 for transporting an original D onto platen 6, and an editor 260 for setting many editing conditions.

Figure 4D:
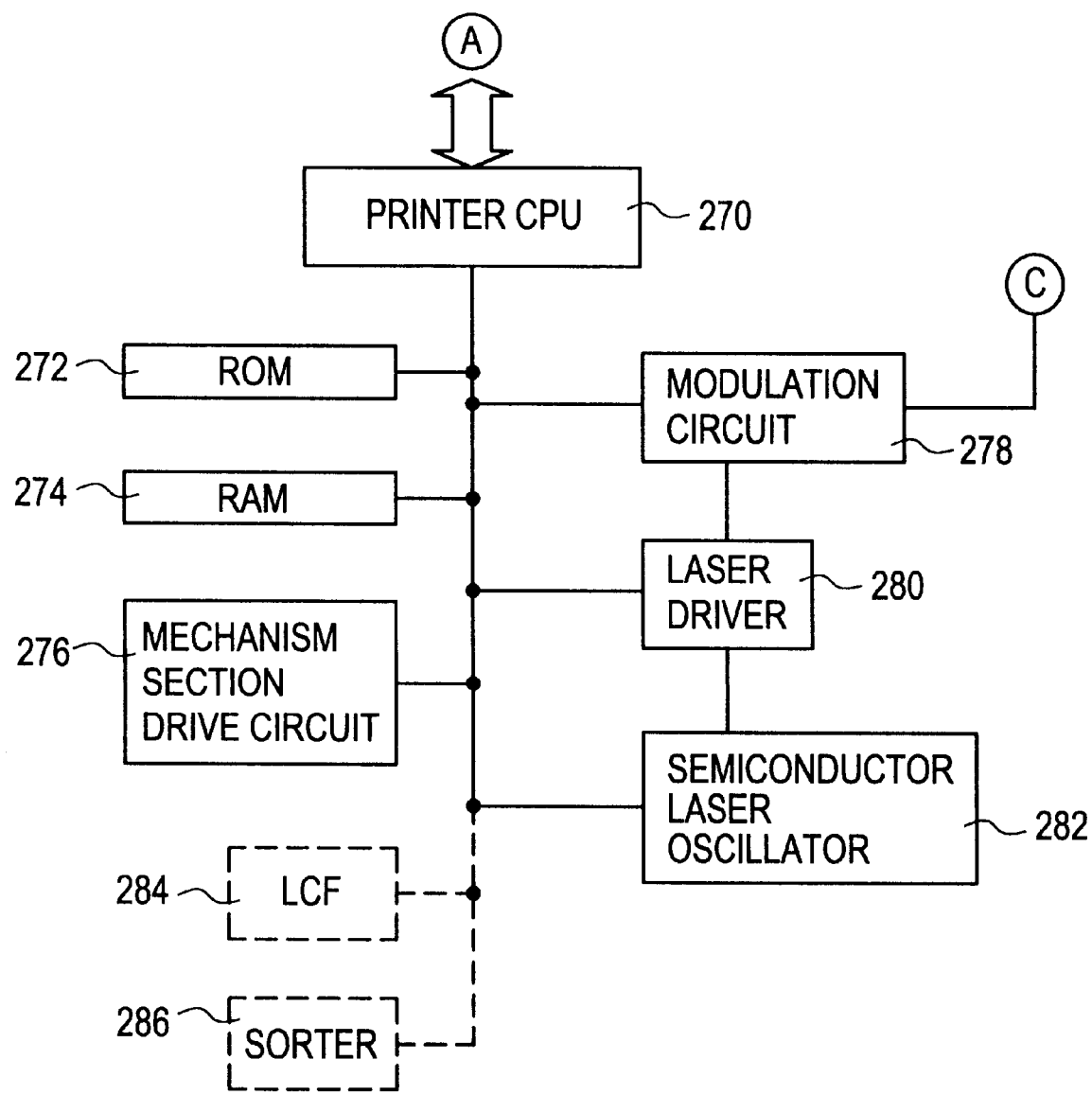

As shown in FIG. 4(d), main CPU 200 is also coupled to a printer CPU 270. A ROM 272 stores a control program. Printer CPU 270 operates in accordance with the control program in ROM 272. A RAM 274 is used as a work buffer of printer CPU 270. Printer CPU 270 is coupled to a mechanism section drive circuit 276 which is provided with drive circuits for driving various types of motors and solenoids in relationship with image-forming unit 42. Printer CPU 270 is also coupled to a modulation circuit 278, a laser driver 280, and a semiconductor laser oscillator 282. Modulation circuit 278 is coupled to buffer memory 210 to receive image data and modulates a laser beam corresponding to image data sent from buffer memory 210. Laser driver 280 energizes semiconductor laser oscillator 282. Furthermore, printer CPU 270 may be coupled to a large capacity feeder 284 for supplying paper sheets P, and a sorter 286 for sorting image-formed paper sheets P.

The scanning operation of image-reading portion 20 is performed as follows.

Figure 5:
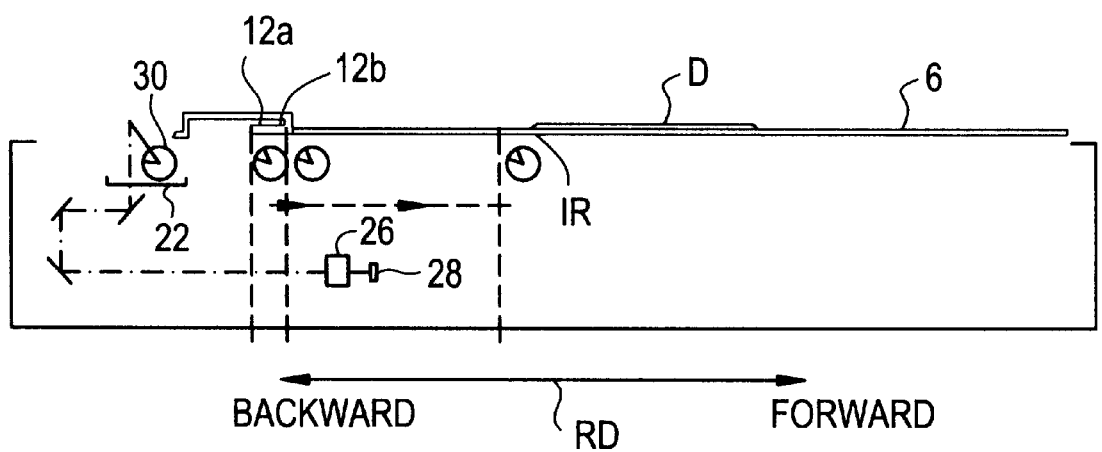
FIG. 5 is a sectional view showing the image-reading portion of the copying machine shown in FIG. 1.

As shown in FIG. 5, when image-reading portion 20 scans an original image of an original D, first carriage 22 moves forward in the direction of arrow RD via a black reference plate 12a and a white reference plate 12b in black/white reference plate 12. Black reference plate 12a is painted in black which is a reference color. White reference plate 12b is painted in white which is a reference color. Image-reading portion 20 starts to scan when first carriage 22 faces an image-reading starting position IR. As a result, each optical image, which corresponds to black/white reference plate 12 and an original D, is made and provided to CCD sensor 28. CCD sensor 28 receives these optical images and outputs electrical signals. The scan speed of first carriage 22 is set to one of a plurality of speeds corresponding to a magnification ratio of main CPU 200, and an accelerating length AL, which is necessary to attain the scan speed, is changed in accordance with the scan speed. The faster the scan speed is, the longer the accelerating length AL is. Therefore, the accelerating length AL may be so short in some cases that first carriage 22 would not pass a plate portion which the black/white reference plate 12 faces. First carriage 22, however, should pass the plate portion every scanning operation so that scanner CPU 240 sets the correcting amount on the basis of a black reference data and a white reference data. Scanner CPU 240 samples a digital data output by A/D converter 252 while an optical image from black reference plate 12a is provided to CCD sensor 28, and gets the black reference data. Scanner CPU 240 also samples a digital data output by A/D converter 252 while an optical image from white reference plate 12b is provided to CCD sensor 28, and gets the white reference data as well. Shading correction circuit 254 uses the correcting amount for shading correction. First carriage 22 positions at the ordinate Wy corresponding to the original size and/or the magnification ratio so as to show the reading area when it does not scan an original image. Thus, first, when first carriage 22 scans an original image, first carriage 22 has to return to a move-starting point. Next, first carriage 22 starts to move forward. Therefore, it is important to decide the move starting point so that the moving length of first carriage 22 is as short as possible. If that is not done, the scanning time period will be prolonged.

In the meantime, if the scan speed is too fast when scanner CPU 240 samples the black reference data and the white reference data, scanner CPU 240 may erroneously sample the black and white reference data. Therefore, the sampling speed is calculated on the basis of the width of black/white reference plate 12, the number of sampling operations, and so on in advance, and the scan speed should be decided in consideration of the sampling speed. The sampling speed is calculated as follows:

$$SAS = \frac{SL(\text{mm}) \times SCS(\text{mm/sec}) \times RES(dpi)}{NS \times 25.4(\text{mm})}$$

wherein,
SAS=the sampling speed,
SL=the sampling length which corresponds to the width of black/white reference plate 12,
SCS=the scan speed when the magnification ratio is 100%,
RES=the resolution, and
NS=the number of the sampling operation.

Image-reading portion 20 performs the scanning operation in accordance with the arrangement described above.

Figure 6A:
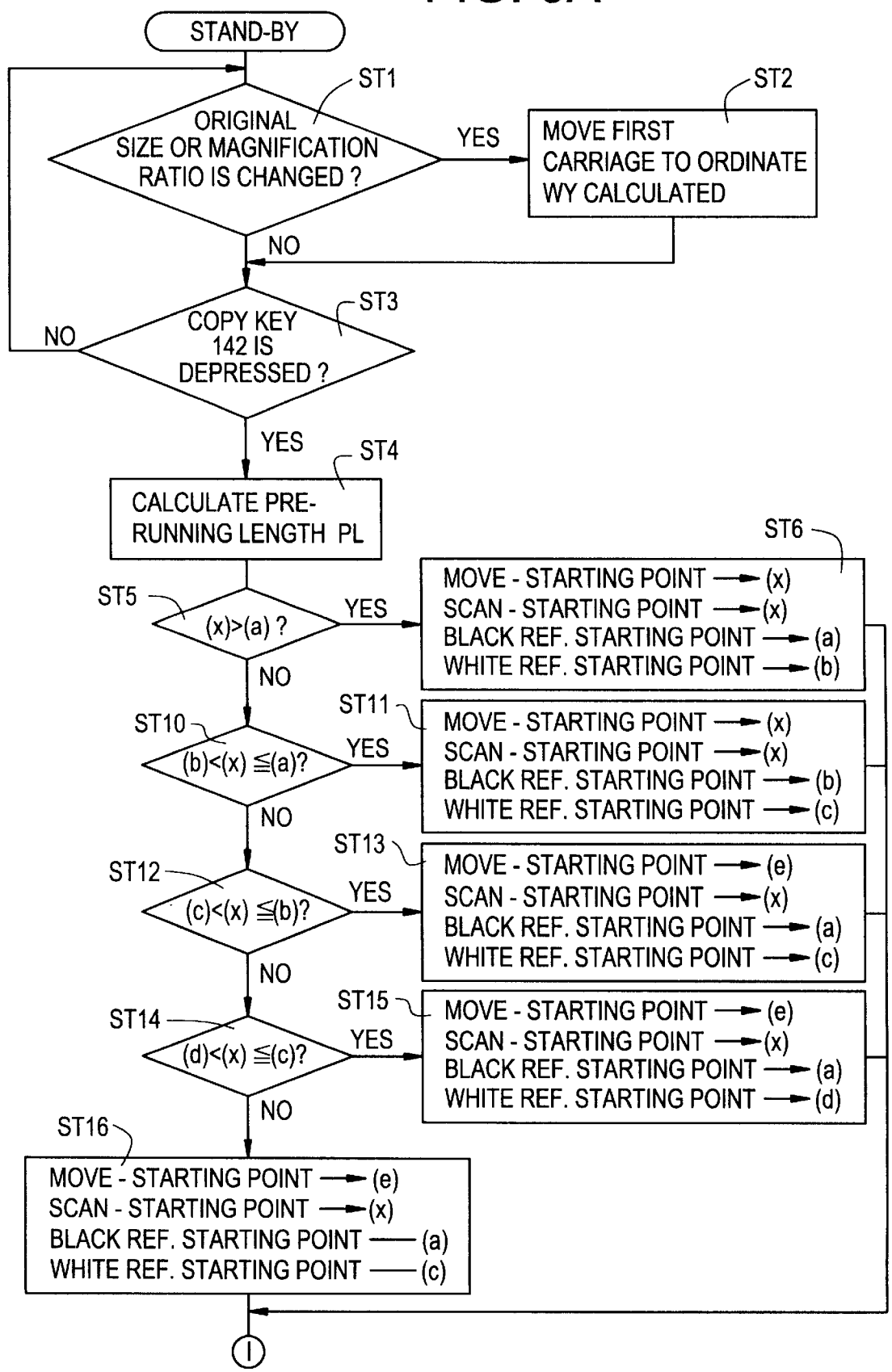
FIGS. 6(a) and 6(b) are flow charts for illustrating the operation of the control system shown in FIGS. 4(a) to 4(d)
Figure 6B:
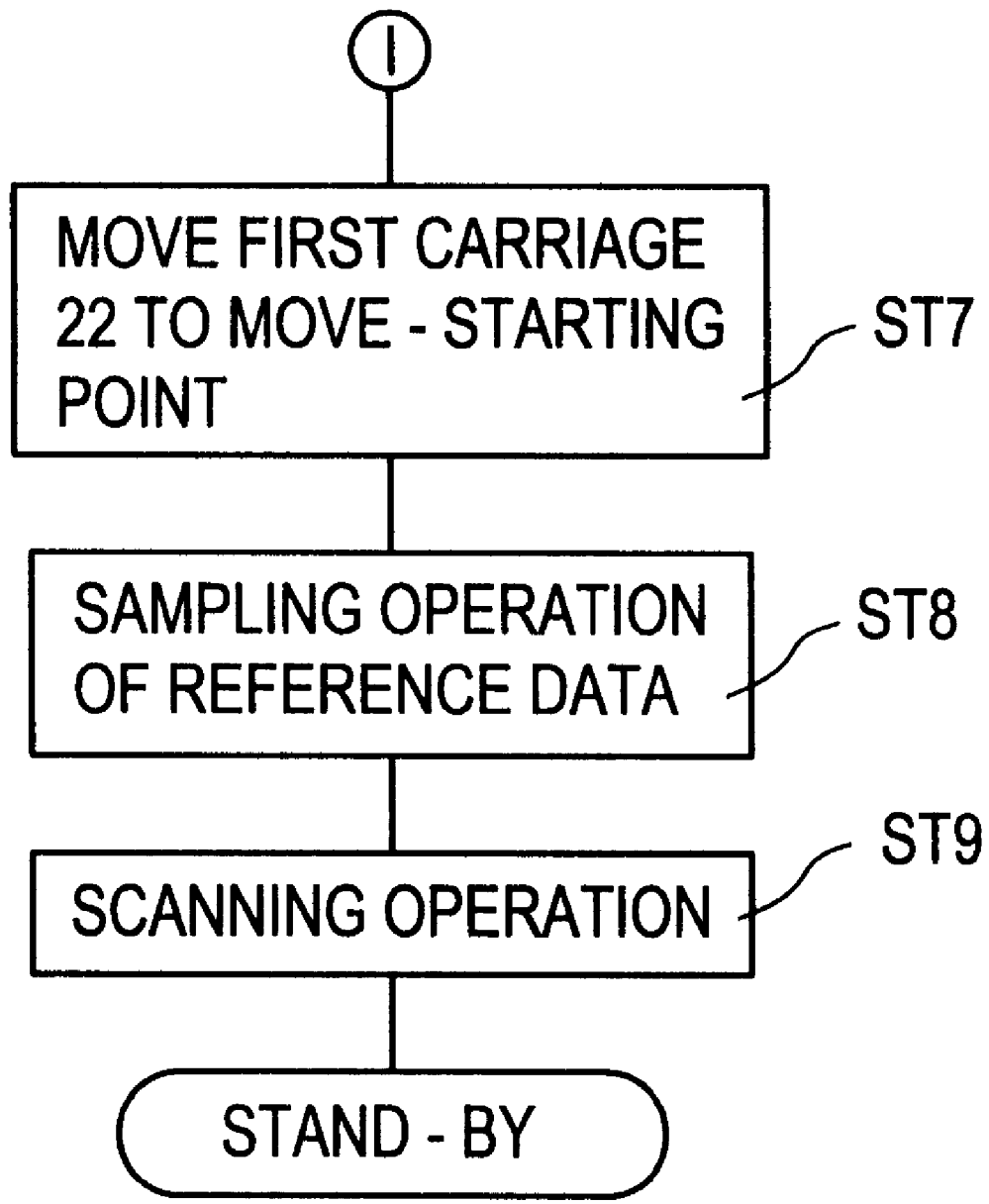

As shown in FIG. 6(a), when copying machine 2 is in the stand-by condition, if either an original size or a magnification ratio is changed by an operator using original size key 164 and zoom keys 162, panel CPU 230 sends a data signal representing an input condition to main CPU 200 (step ST1). Main CPU 200 calculates the ordinate Wy as described above, and causes scanner CPU 240 to move first carriage 22 to the calculated ordinate Wy (step ST2). In the meantime, when copying machine 2 is in the stand-by condition and before an operator operates control panel 140, the magnification ratio and the original size are set in 100% and A4-crosswise, respectively.

Next, main CPU 200 checks whether copy key 142 is depressed (step ST3). If main CPU 200 determines that copy key 142 is depressed on the basis of the signal sent from panel CPU 230, then main CPU 200 calculates a pre-running length PL which includes the accelerating length AL and a margin length corresponding to the magnification ratio by using the data table in ROM 202 (step ST4). When the scan speed is at a high speed, vibrations may occur in image-reading portion 20. The vibrations cause difficulty in reading an original image finely. Therefore, the margin length is arranged for eliminating the vibrations before first carriage 22 has reached the image-reading starting portion IR. A scan-starting point (X), at which first carriage 22 starts to move so as to scan an original image, is set at a position which is the pre-running length PL away from the image-reading starting position IR. In this embodiment, one of five moving patterns is chosen corresponding to the scan-starting point (X).

Figure 7:
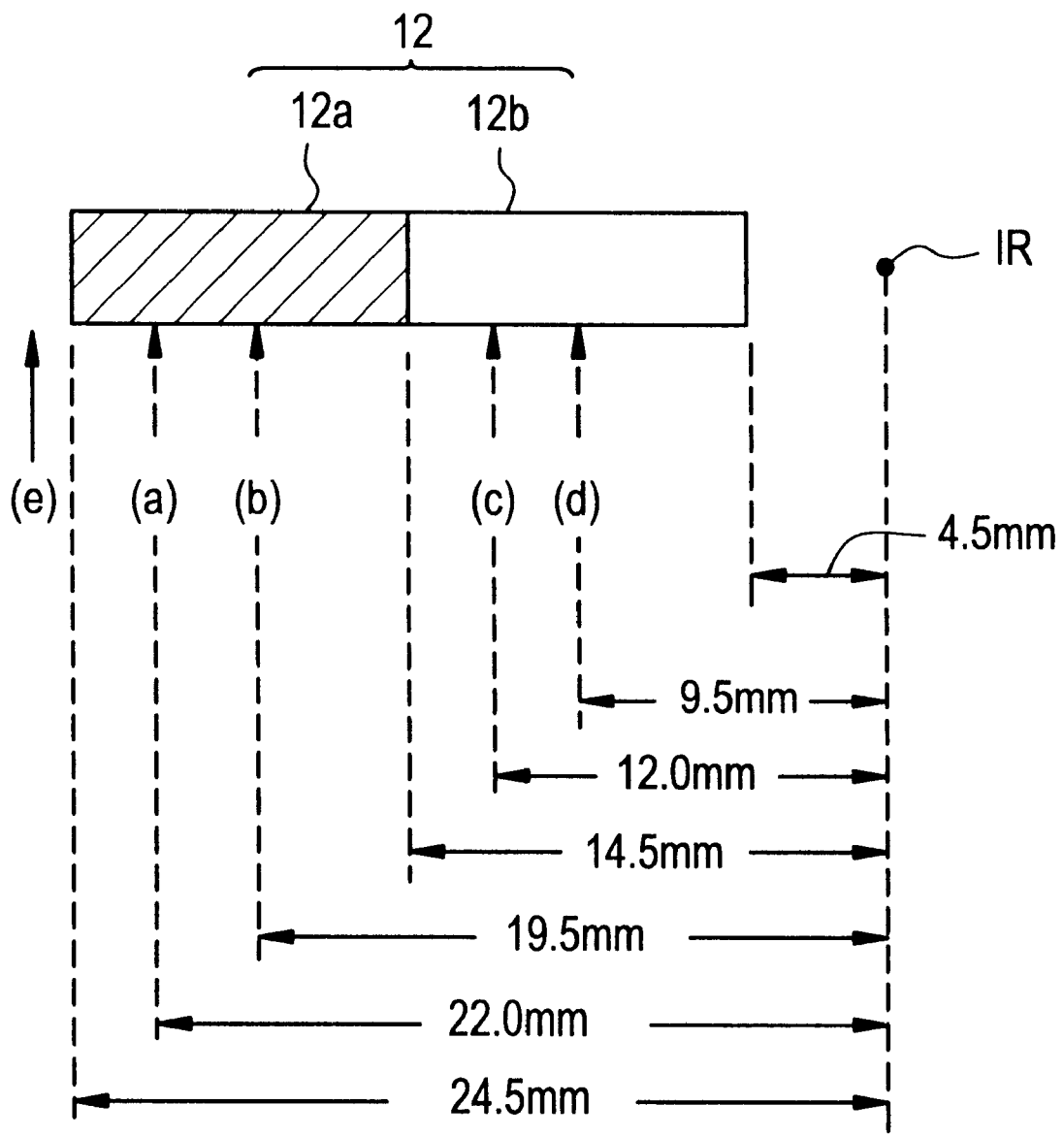
FIG. 7 is an enlarged view of a portion of the sectional view of FIG. 5 for showing an arrangement of a black/white reference plate.

As shown in FIG. 7, black/white reference plate is about 4.5 mm away from the image-reading starting position IR, each of black reference plate 12a and white reference plate 12b is about 10.0 mm width. Points (a), (b), (c), (d), and (e) are determined in advance. In this case, the point (b) corresponds to the central portion of black reference plate 12a, and the point (d), corresponds to the central portion of white reference plate 12b. The point (a) corresponds to the middle between the point (b) and the far end of black reference plate 12a, the point (c) corresponds to the middle between the point (d) and the far end of white reference plate 12(b). The point (e) is set just outside black reference plate 12(a).

Figure 8A:
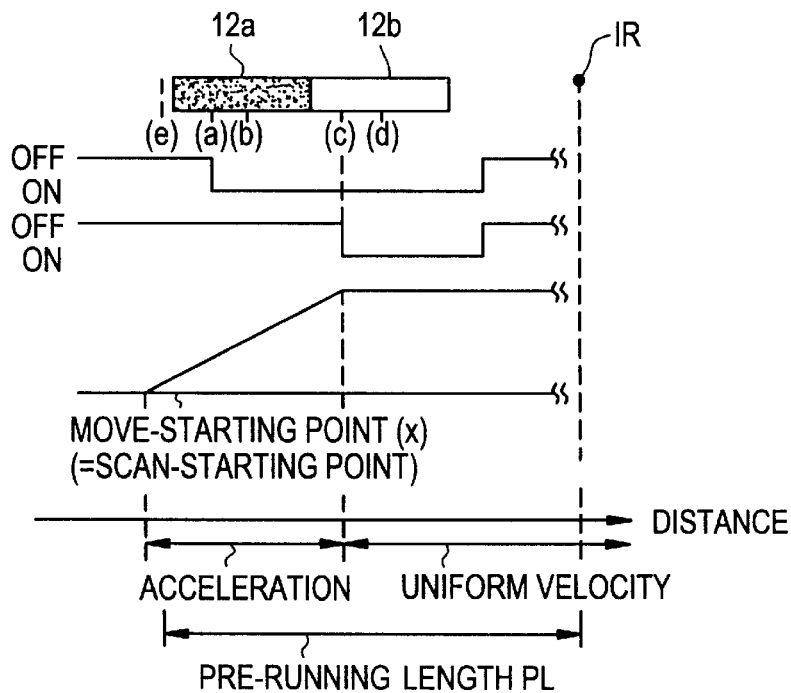

After step ST4, main CPU 200 checks where the scan-starting point (x) corresponds to in relation to the points (a), (b), (c), and (d). If main CPU 200 determines that the point (x) is farther than the point (a), namely, the pre-running length PL is bigger than 22.0 mm, then main CPU 200 sets the move-starting point, the scan-starting point, a black-reference sampling starting point, and a white-reference sampling starting point in the point (x), the point (x), the point (a), and the point (c), respectively (steps ST5 and ST6). In this embodiment, when the magnification ratio is from 25% to 59%, the point (x) is farther than the point (a). Then, main CPU 200 causes scanner CPU 240 to move the first carriage 22 to the move-starting point which is the point (x) (step ST7). As shown in FIG. 8(a), scanner CPU 240 moves first carriage 22 from the move-starting point (x), and performs a sampling operation of a reference data, while first carriage 22 moves a pre-running portion corresponding to the pre-running length PL so as to make the correcting amount for the shading correction (step ST8). In relation to the sampling operation, scanner CPU 240 turns on a black-reference sampling starting signal when first carriage 22 has reached at the point (a), and turns on a white-reference sampling starting signal provided to shading correction circuit 254 when first carriage 22 has reached at the point (c). Scanner CPU 240 samples the black and white reference data a predetermined number of times, for example, five times, after the sampling starting signal is turned on. The number of times is counted by scanner CPU 240. When the number has reached the predetermined number of times, scanner CPU 240 ends the sampling operation. Then, scanner CPU 240 subsequently performs the image-reading operation in the scanning operation while shading correcting circuit 254 corrects the digital signals by using the correcting amount which scanner CPU 240 sets on the basis of the reference data sampled (step ST9).

Figure 8B:
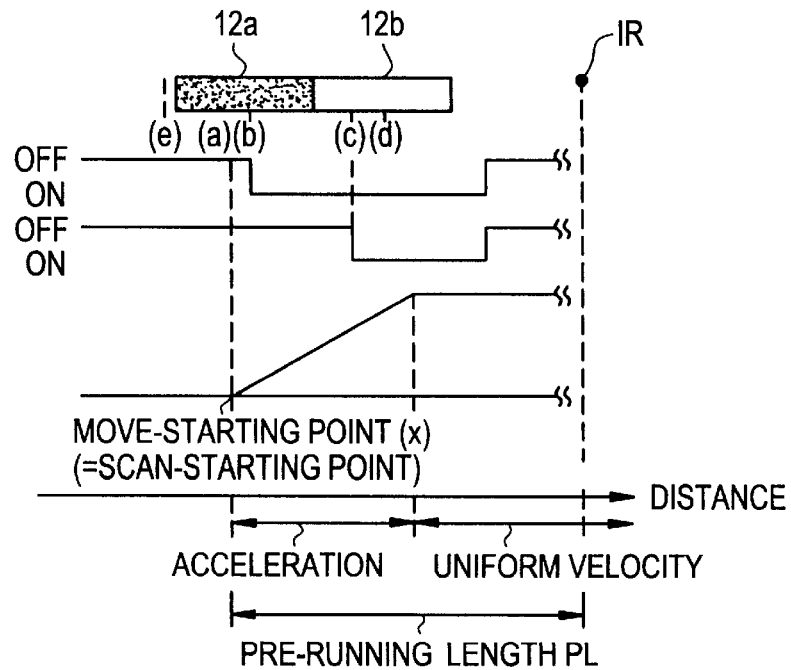

If main CPU 200 determines at step ST5 that the point (x) is not farther than the point (a), main CPU 200 checks whether the point (x) is farther than the point (b), namely, the pre-running length PL is bigger than 19.5 mm (step ST10). In this embodiment, when the magnification ratio is changed from 60% to 66%, the point (x) is not farther than the point (a), and is farther than the point (b). If main CPU 200 determines that the point (x) is farther than the point (b), then main CPU 200 sets the move-starting point, the scan-starting point, the black-reference sampling starting point, and the white-reference sampling starting point in the point (x), the point (x), the point (b), and the point (c), respectively (step ST11). Then main CPU 200 causes scanner CPU 240 to move first carriage 22 to the move-starting point which is the point (x) (step ST7). As shown in FIG. 8(b), scanner CPU 240 moves first carriage 22 from the move-starting point (x), and performs the sampling operation of a reference data while first carriage 22 moves the pre-running portion so as to make the correcting amount for the shading correction (step ST8). In relation to the sampling operation, scanner CPU 240 turns on the black-reference sampling starting signal provided to shading correction circuit 254 when first carriage 22 has reached at the point (b), and turns on the white-reference sampling starting signal when first carriage 22 has reached at the point (c). Scanner CPU 240 performs the sampling operation and the image-reading operation in the scanning operation (steps ST8 and ST9).

In the case of FIG. 8(a), scanner CPU 240 may complete to sample the black reference data five times for the time period for which first carriage 22 takes to pass from the point (a) to the near end of black reference plate 12a. In the case of FIG. 8(b), scanner CPU 240 may complete to sample the black reference data five times for the time period for which first carriage 22 takes to pass from the point (b) to the near end of black reference plate 12a, because the speed of first carriage 22 in the case of FIG. 8(b) is slower than that of first carriage 22 in the case of FIG. 8(a) when first carriage 22 passes from the point (b) to the near end of black reference plate 12a. Therefore, the points (a) and (b) are set from this view point. In other words, if there is another point at which such a condition is satisfied, even if the distance between the point and the near end is narrower than the distance between the point (b) and the near end, it is possible to set the point as well as the points (a) and (b).

Figure 8C:
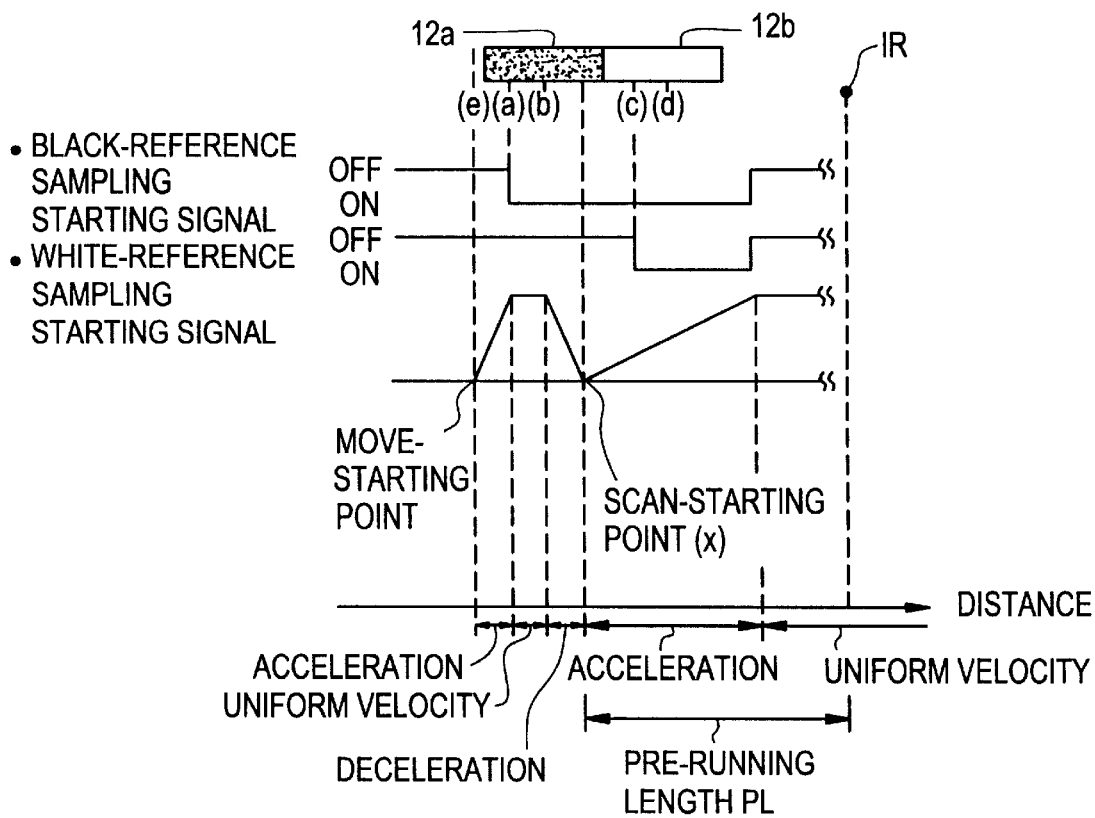

If main CPU 200 determines at step ST10 that the point (x) is not farther than the point (b), main CPU 200 checks whether the point (x) is farther than the point (c), namely, the pre-running length PL is bigger than 12.0 mm (step ST12). In this embodiment, when the magnification ratio is changed from 67% to 144%, the point (x) is not farther than the point (b), and is farther than the point (c). If main CPU-200 determines that the point (x) is farther than the point (c) then main CPU 200 sets the move-starting point, the scan-starting point, the black-reference sampling starting point, and the white-reference sampling starting point in the point (e), the point (x), the point (a), and the point (c), respectively (step ST13). Then, main CPU 200 causes scanner CPU 240 to move first carriage 22 to the move-starting point which is the point (e) (step ST7). As shown in FIG. 8(c), scanner CPU 240 moves first carriage 22 from the point (e) to the point (x) at a predetermined moving velocity, and turns on the black-reference sampling starting signal when first carriage 22 has reached at the point (a) so as to perform the sampling operation of the black reference data (step ST8). Subsequently, scanner CPU 240 starts to move first carriage 22 from the scan-starting point which is the point (x), and turns on the white-reference sampling starting signal when first carriage 22 has reached at the point (c) so as to perform the sampling operation of the white reference data during the acceleration. Then, scanner CPU 240 performs the image-reading operation in the scanning operation while shading correction circuit 254 corrects the digital signals by using the correcting amount which scanner CPU 240 sets on the basis of the reference data sampled (step ST9).

Figure 8D:
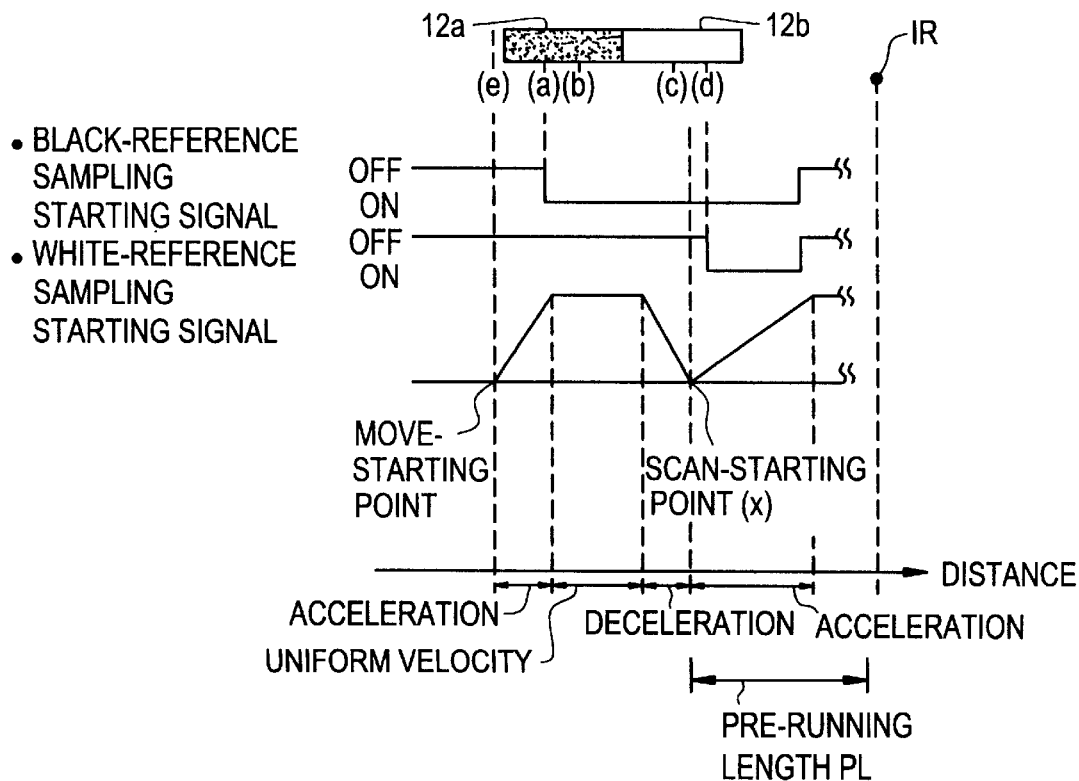

If main CPU 200 determines at step ST12 that the point (x) is not farther than the point (c), main CPU 200 checks whether the point (x) is farther than the point (d), namely, the pre-running length PL is bigger than 9.5 mm (step ST14). In this embodiment, when the magnification ratio is changed from 145% to 179%, the point (x) is not farther than the point (c), and is farther than the point (d). If main CPU 200 determines that the point (x) is farther than the point (d), then main CPU 200 sets the move-starting point, the scan-starting point, the black-reference sampling starting point, and the white-reference sampling starting point in the point (e), the point (x), the point (a), and the point (d), respectively (step ST15). Then, main CPU 200 causes scanner CPU 240 to move first carriage 22 to the move-starting point which is the point (e) (step ST7). As shown in FIG. 8(d), scanner CPU 240 moves first carriage 22 from the point (e) to the point (x) at the predetermined moving velocity, and turns on the black-reference sampling starting signal when first carriage 22 has reached at the point (a) so as to perform the sampling operation of the black reference data (step ST8). Subsequently, scanner CPU 240 starts to move first carriage 22 from the scan-starting point which is the point (x), and turns on the white-reference sampling starting signal when first carriage 22 has reached at the point (d) so as to perform the sampling operation of the white reference data during the acceleration. Then, scanner CPU 240 performs the image-reading operation in the scanning operation while shading correction circuit 254 corrects the digital signals by using the correcting amount which scanner CPU 240 sets on the basis of the reference data sampled (step ST9).

If main CPU 200 determines at step ST14 that the point (x) is not farther than the point (d), then main CPU 200 sets the move-starting point, the scan-starting point, the black-reference sampling starting point and the white-reference sampling starting point in the point (e), the point (x), the point (a), and the point (c), respectively, (step ST16). In this embodiment, when the magnification ratio is changed from 180% to 800%, the point (x) is not farther than the point (d). Then, main CPU 200 causes scanner CPU 240 to move first carriage 22 to the move-starting point which is the point (e) (step ST7). As shown in FIG. 8(e), scanner CPU 240 moves first carriage 22 from the point (x) at the predetermined moving velocity. Scanner CPU 240 turns on the black-reference sampling starting signal when first carriage 22 has reached at the point (a) so as to perform the sampling operation of the black reference data, and turns on the white-reference sampling starting signal when first carriage 22 has reached at the point (c) so as to perform the sampling operation of the white reference data (step ST8). Subsequently, scanner CPU 240 starts to move first carriage 22 from the scan-starting point which is the point (x), and performs the image-reading operation in the scanning operation while shading correction circuit 254 corrects the digital signals by using the correcting amount which scanner CPU 240 sets on the basis of the reference data sampled (step ST9).

After step ST9, copying machine 2 performs the copying operation based on the image data formed by image-reading portion 20. Finally, copying machine 2 returns into the stand-by condition.

In this embodiment, black/white reference plate 12 is used for the sampling operation. However, it is possible to use a white/black reference plate as well.

The present invention may be embodied in other specific forms without departing from the spirit or essential characteristics thereof. The presently described embodiments are therefore to be considered in all respects as illustrative and not restrictive. The scope of the present invention is indicated by the appended claims rather than by the foregoing description, and all changes which come within the meaning and range of equivalency of the claims are therefore intended to be embraced therein.

What is claimed is:

1. An image reading apparatus for scanning an original in an image-reading area to output image data, comprising:

a platen on which the original is placed;

an exposure lamp for exposing the original to make an optical image;

a carriage on which the exposure lamp is arranged, the carriage moving along the original placed on the platen;

a reference plate which has a reference color, the reference plate being arranged near the platen;

a driving mechanism connected to the carriage, for driving the carriage at one of a plurality of speeds so that the exposure lamp exposes the reference plate and the original in order;

a CCD sensor for receiving a first optical image from the reference plate and a second optical image from the original exposed by the exposure lamp so as to output electrical signals;

setting means for setting a correcting amount on the basis of the electrical signals corresponding to the first optical signals;

a shading correction circuit for correcting scattering of the electrical signals by using the correcting amount, and for outputting the image data;

means for calculating a pre-running length corresponding to the speed at which the carriage is driven, the driving mechanism accelerating the carriage in a pre-running portion corresponding to the pre-running length so that the carriage achieves the speed;

means for determining that the reference plate is sufficiently included in the pre-running length; and means for controlling the driving mechanism and the CCD sensor so that the CCD sensor outputs the electrical signals corresponding to the first optical image while the driving mechanism moves the carriage in the pre-running portion when the determining means determines that the reference plate is sufficiently included in the pre-running length, and so that the carriage faces the reference plate before the carriage arrives at the pre-running length and the CCD sensor outputs the electrical signals corresponding to the first optical image when the determining means determines that the reference plate is not sufficiently included in the pre-running length.

2. An image-reading apparatus according to claim 1, wherein the platen is a transparent material, and the carriage comprises a mark for showing the image-reading area through the platen.

3. An image-reading apparatus according to claim 2, wherein the driving mechanism drives the carriage so that the mark shows the image-reading area when the image-reading apparatus is in a stand-by condition, and wherein the exposure lamp exposes the reference plate before the original is exposed.

4. An image reading apparatus for scanning an original in an image-reading area to output image data, comprising:

a platen on which the original is placed;

a reference plate which has a reference color, the reference plate being arranged near the platen;

means for optically scanning the reference plate and the original placed on the platen to provide a first optical image and a second optical image;

means for receiving the first optical image an the second optical image so as to output electrical signals;

setting means for setting a correcting amount on the basis of the electrical signals corresponding to the first optical signals;

means for correcting scattering of the electrical signals corresponding to the second optical image by using the correcting amount, and for outputting the image data;

means for calculating a pre-running length corresponding to a predetermined speed, the scanning means being accelerated in a pre-running portion corresponding to the pre-running length so that the scanning means reaches the predetermined speed;

means for determining whether the reference plate is sufficiently included in the pre-running length; and means for controlling the scanning mechanism and the receiving means so that the receiving means outputs the electrical signals corresponding to the first optical image while the scanning means moves in the pre-running portion when the determining means determines that the reference is sufficiently included in the pre-running length, and so that the scanning means scans the reference plate before the scanning means arrives at the pre-running length and the receiving means outputs the electrical signals corresponding to the first optical image when the determining means determines that the reference plate is not sufficiently included in the pre-running length.

5. An image-reading apparatus according to claim 4, wherein the platen is a transparent material, and the scanning means comprises a mark for showing the image-reading area through the platen.

6. An image-reading apparatus according to claim 5, wherein the scanning means is positioned in a redetermined position so that the mark shows the image-reading area when the image-reading apparatus is in a stand-by condition.

7. An image-forming apparatus for forming an image on an image-bearing member on the basis of image data corresponding to an original image of an original, comprising:

a platen on which the original is placed;

a reference plate which has a reference color, the reference plate being arranged near the platen;

means for optically scanning the reference plate and the original placed on the platen so as to provide a first optical image and a second optical image;

means for receiving the first optical image and the second optical image so as to output electrical signals;

means for setting a correcting amount on the basis of the electrical signals corresponding to the first optical image;

means for correcting scattering of the electrical signals corresponding to the second optical image by using the correcting amount, and for outputting the image data;

means for forming the image on a image-bearing member on the basis of the image data;

means for calculating a pre-running length corresponding to a predetermined speed, the scanning means being accelerated in a pre-running portion corresponding to the pre-running length so that the scanning means reaches the predetermined speed;

means for determining whether the reference plate is sufficiently included in the pre-running length; and means for controlling the scanning mechanism and the receiving means so that the receiving means outputs the electrical signals corresponding to the first optical image while the scanning means moves in the pre-running portion when the determining means determine that the reference plate is sufficiently included in the pre-running length, and so that the scanning means scans the reference plate before the scanning means arrives at the pre-running length and the receiving means outputs the electrical signals corresponding to the first optical image when the determining means determines that the reference plate is not sufficiently included in the pre-running length.

8. An image-forming apparatus according to claim 7, wherein the platen is a transparent material, and the scanning means comprises a mark for showing an image-reading area through the platen.

9. An image-forming apparatus according to claim 8, wherein the scanning means positions in a predetermined position so that the mark shows the image-reading area when the image-reading apparatus is in a stand-by condition.

10. An image-scanning method for optically scanning an original in an image-reading area by a scanning member to output image data, comprising the steps of:

(1) when a moving speed of the scanning member is more than a predetermined speed, and the scanning member passes a reference plate during a pre-running operation of the scanning member, moving the scanning member to a first move-starting point which is about a pre-running length away from the original;

driving the scanning member from the move-starting point so as to accelerate up to the moving speed;

receiving a first optical image corresponding to the reference plate while the scanning member moves in a pre-running portion corresponding to the pre-running length, the first optical image being formed by the scanning member;

setting a first correcting amount on the basis of the first optical image;

driving the scanning member at the moving speed in the image-reading area;

receiving a second optical image corresponding to an original image to output a first electrical signal; and correcting the first electrical signal on the basis of the correcting amount to output the image data;

(2) when the moving speed of the scanning member is not more than the predetermined speed, and the scanning member does not sufficiently pass the reference plate during the pre-running operation of the scanning member, moving the scanning member to a second move-starting point which is farther than the pre-running length from the original and which is set so that the scanning member passes the reference plate;

driving the scanning member from the second move-starting point to a scan-starting point at a predetermined speed;

receiving the first optical image corresponding to the reference plate, the first optical image being formed by the scanning member;

setting a second correcting amount on the basis of the first optical image;

driving the scanning member from the scan-starting point so that the scanning member is accelerated and is moved at the moving speed in the image-reading area;

receiving a third optical image corresponding to the original image to output a second electrical signal; and correcting the second electrical signal on the basis of the second correcting amount to output the image data.

11. An image-scanning method for optically scanning an original in an image-reading area by a scanning member to output image data, comprising the steps of:

setting a set moving speed of the scanning member;

moving the scanning member to a move-starting point which is about a pre-running length away from the original, the pre-running length corresponding to the set moving speed, the scanning member moving in a pre-running portion corresponding to the pre-running length before actual moving speed of the scanning member has reached the set moving speed;

driving the scanning member from the move-starting position so as to reach the set moving speed;

receiving a first optical image formed by the scanning member at the reference plate while the scanning member moves in the pre-running portion;

setting a correcting amount on the basis of the first optical image;

driving the scanning member at the set moving speed in the image-reading area;

receiving a second optical image corresponding to an original image to output an electrical signal; and correcting the electrical signal on the basis of the correcting amount to output the image data.

* * * * *